(12) United States Patent
Erden et al.

(10) Patent No.: US 6,754,015 B2
(45) Date of Patent: Jun. 22, 2004

(54) MR HEADS THERMAL ASPERITY CANCELLATION

(75) Inventors: Mehmet F. Erden, Pittsburgh, PA (US); Erozan M. Kurtas, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 73 days.

(21) Appl. No.: 10/224,825

(22) Filed: Aug. 21, 2002

(65) Prior Publication Data

US 2003/0184897 A1 Oct. 2, 2003

Related U.S. Application Data

(60) Provisional application No. 60/368,908, filed on Mar. 29, 2002.

(51) Int. Cl.[7] .................................................. G11B 5/02
(52) U.S. Cl. .............................. 360/25; 360/53; 360/51
(53) Field of Search .............................. 360/25, 46, 53, 360/31, 51

(56) References Cited

U.S. PATENT DOCUMENTS

| | | |
|---|---|---|
| 4,816,743 A | 3/1989 | Harms et al. |
| 4,881,136 A | 11/1989 | Shiraishi et al. |
| 4,914,398 A | 4/1990 | Jove et al. |
| 4,942,609 A | 7/1990 | Meyer |
| 5,270,882 A | 12/1993 | Jove et al. |
| 5,367,409 A | 11/1994 | Ottesen et al. |
| 5,410,439 A | 4/1995 | Egbert et al. |
| 5,424,638 A | 6/1995 | Huber |
| 5,455,730 A | 10/1995 | Dovek et al. |
| 5,497,111 A | 3/1996 | Cunningham |
| 5,527,110 A | 6/1996 | Abraham et al. |
| 5,537,035 A | 7/1996 | Fowler et al. |
| 5,559,460 A | 9/1996 | Cunningham |
| 5,587,848 A | 12/1996 | Shimotashiro et al. |
| 5,654,943 A | 8/1997 | Ohmori |
| 5,666,237 A | 9/1997 | Lewis |
| 5,708,537 A | 1/1998 | Galbraith et al. |
| 5,715,110 A | 2/1998 | Nishiyama et al. |
| 5,737,157 A | 4/1998 | Gill |
| 5,793,207 A | 8/1998 | Gill |
| 5,793,240 A | 8/1998 | Kuwano et al. |
| 5,793,576 A | 8/1998 | Gill |
| 5,808,184 A | 9/1998 | Boutaghou et al. |
| 5,822,139 A | 10/1998 | Ayabe |
| 5,844,920 A | 12/1998 | Zook et al. |
| 5,847,890 A | 12/1998 | Hattori |
| 5,852,521 A | 12/1998 | Umeyama et al. |
| 5,896,243 A | 4/1999 | Koshikawa et al. |
| 5,898,532 A | 4/1999 | Du et al. |
| 5,898,535 A | 4/1999 | Kawai |
| 5,898,542 A | 4/1999 | Koshikawa et al. |
| 5,917,670 A | 6/1999 | Scaramuzzo et al. |
| 5,956,197 A | 9/1999 | Le et al. |
| 5,973,553 A | 10/1999 | Kim |

(List continued on next page.)

OTHER PUBLICATIONS

V. Dorfman and J.K. Wolf, "A Method for Reducing the Effects of Thermal Asperities," IEEE Journal on Selected Areas in Communications, vol. 19, No. 4, pp. 662–667, Apr. 2001.

Primary Examiner—Alan T. Faber
(74) Attorney, Agent, or Firm—Westman, Champlin & Kelly, P.A.

(57) ABSTRACT

A disc drive data recovery system for recovering data from a magnetic disc having asperities provided. Readback data follows a nominal readback path and a thermal asperity cancellation readback path. A thermal asperity detector detects a thermal asperity in the readback signal and responsively selects the readback signal which follows the thermal asperity cancellation readback path.

18 Claims, 10 Drawing Sheets

U.S. PATENT DOCUMENTS

| | | | |
|---|---|---|---|
| 5,995,313 A | 11/1999 | Dakroub | |
| 6,005,726 A | 12/1999 | Tsunoda | |
| 6,018,428 A | 1/2000 | Okamura | |
| 6,034,829 A | 3/2000 | Suzuki et al. | |
| 6,038,091 A | 3/2000 | Reed et al. | |
| 6,040,953 A | 3/2000 | Malone et al. | |
| 6,049,763 A | 4/2000 | Christiansen et al. | |
| 6,071,007 A | 6/2000 | Schaenzer et al. | |
| 6,091,557 A | 7/2000 | Hashizume | |
| 6,094,316 A | 7/2000 | Pham et al. | |
| 6,101,054 A | 8/2000 | Tsunoda | |
| 6,104,557 A | 8/2000 | Kasai et al. | |
| 6,111,711 A | 8/2000 | Barber et al. | |
| 6,119,261 A | 9/2000 | Dang et al. | |
| 6,130,791 A | 10/2000 | Muto | |
| 6,130,793 A | 10/2000 | Ohmori et al. | |
| 6,137,643 A | 10/2000 | Flynn | |
| 6,175,457 B1 | 1/2001 | Flynn | |
| 6,175,459 B1 | 1/2001 | Tomita | |
| 6,178,053 B1 | 1/2001 | Narita | |
| 6,185,079 B1 | 2/2001 | Gill | |
| 6,191,908 B1 | 2/2001 | Tachikawa | |
| 6,226,136 B1 | 5/2001 | Chern | |
| 6,255,898 B1 | 7/2001 | Ono et al. | |
| 6,265,869 B1 | 7/2001 | Takahashi | |

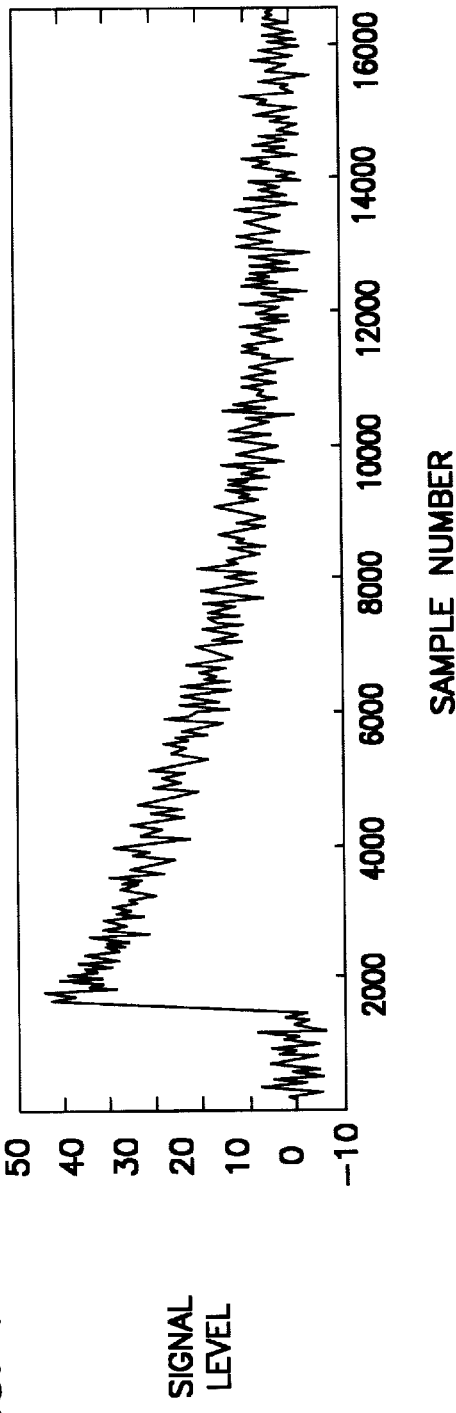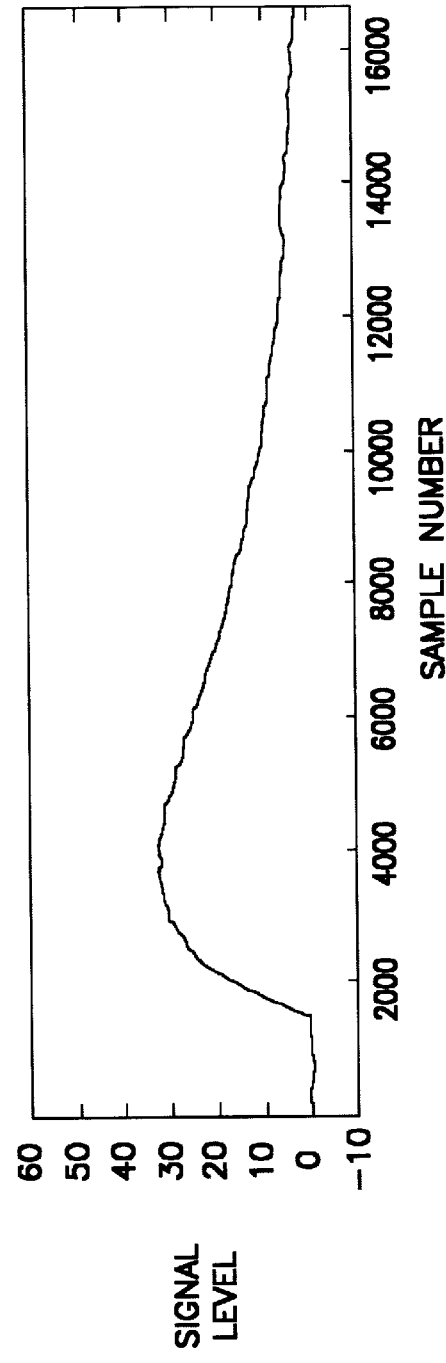

MR HEADS THERMAL ASPERITY CANCELLATION

CROSS-REFERENCE TO RELATED APPLICATION

This application claims priority from U.S. Provisional Application No. 60/368,908, filed Mar. 29, 2002; for inventors Mehmet F. Erden and Erozan M. Kurtas and entitled CANCELING THERMAL ASPERITIES IN MAGNETIC RECORDING ARCHITECTURES.

FIELD OF THE INVENTION

The present invention relates to disc drive data storage and recovery systems. More particularly, the present invention relates to a disc drive data recovery system for recovering data from a surface of a magnetic disc having asperities.

BACKGROUND OF THE INVENTION

In disc drives having magnetoresistive (MR) heads, the slider which carries the MR head flies over a surface of a magnetic disc having data stored in a magnetically encoded format. The MR head provides a read signal, indicative of the data read from the disc, to a preamplifier circuit. After amplification by the preamplifier, the read signal is filtered prior to being received by the read channel of the disc drive.

Defects above the surface of the disc, known as asperities, result in undesirable head-to-disc interaction as the head slider flies over the surface defect on the disc. Immediately after contact with an asperity, the heat (i.e., a thermal asperity) generated by the contact changes the resistive properties of the MR head. As a result, the corresponding signal read by the MR head is distorted by a voltage spike and subsequent decay, sometimes causing the data stored near the thermal asperity to be unrecoverable. For example, a thermal asperity may last for one to two microseconds, which represents a data error generally beyond the preferred maximum error correction length of the typical error correction code (ECC) used by the disc drive. For example, a one-microsecond thermal asperity which occurs on a track written at 128 Mbits per second will corrupt 16 bytes of data. If the ECC capability is less than 16 bytes, the thermal asperity will cause the entire sector of data to be unrecoverable.

The number of thermal asperities existing on a single disc drive is typically found to be small in comparison to other types of media defects. Therefore, asperities which are located in the factory during the defect scanning process are recorded in the drive's primary defect list, and the drive does not store data at those locations. However, some asperities go undetected during the factory defect scanning process and only become problematic after the disc drive is operating in the field. For these undetected and other "growth" asperity defects, a method of recovery is needed which will significantly increase the chances of recovering data recorded over the asperity.

A number of prior art techniques have attempted to address the effects of thermal asperities in the recording system. Current design of integrated circuits used in magnetic storage systems include a high pass filter to filter the readback signal when a thermal asperity is detected. The effects of the thermal asperity can be reduced by increasing the high pass cutoff frequency of the filter. However, by doing so, the low frequency contents of the readback signal are filtered which negatively impacts system performance, especially in perpendicular recording systems where a significant amount of information is carried in low frequency components. Another technique to address thermal asperities is to insert a null into the target response when a thermal asperity is detected. However, the channel is equalized to a response having a null at DC. This is similar to filtering out the low frequency components of the readback signal which, as discussed above, can be undesirable. A third technique involves addressing the effects of a thermal asperity offline and by attempting to recover data using coding techniques.

The present invention provides a solution to this and other problems and offers advantages over the prior art.

SUMMARY OF THE INVENTION

The present invention relates to a method and apparatus for canceling the effects of a thermal asperity in a readback signal from a magnetoresistive sensor in a magnetic storage system which solves the above-mentioned problem.

In accordance with one embodiment of the invention, a cancellation method and apparatus are provided in which readback data from a magnetoresistive head follows a nominal readback path during normal operation. The nominal readback path includes a buffer which delays the readback data. Readback data through a thermal asperity cancellation readback path is selected upon detection of a thermal asperity. The thermal asperity cancellation readback path introduces a filter delay and the delay in the nominal readback path is configured to match the delay in the cancellation readback path.

These and various other features as well as advantages which characterize the present invention will be apparent upon reading of the following detailed description and review of the associated drawings.

BRIEF DESCRIPTION OF THE DRAWINGS

FIG. 7 is a graph of signal level vs. sample number for a readback signal containing a thermal asperity following low pass filtering.

FIG. 8 is a graph of signal level vs. sample number for a readback signal containing a thermal asperity following another low pass filtering.

FIGS. 11E, 12E and 13E are graphs of signal level vs. sample number for thermal asperity free readback signals with B=40.

DETAILED DESCRIPTION OF ILLUSTRATIVE EMBODIMENTS

Figure 1:
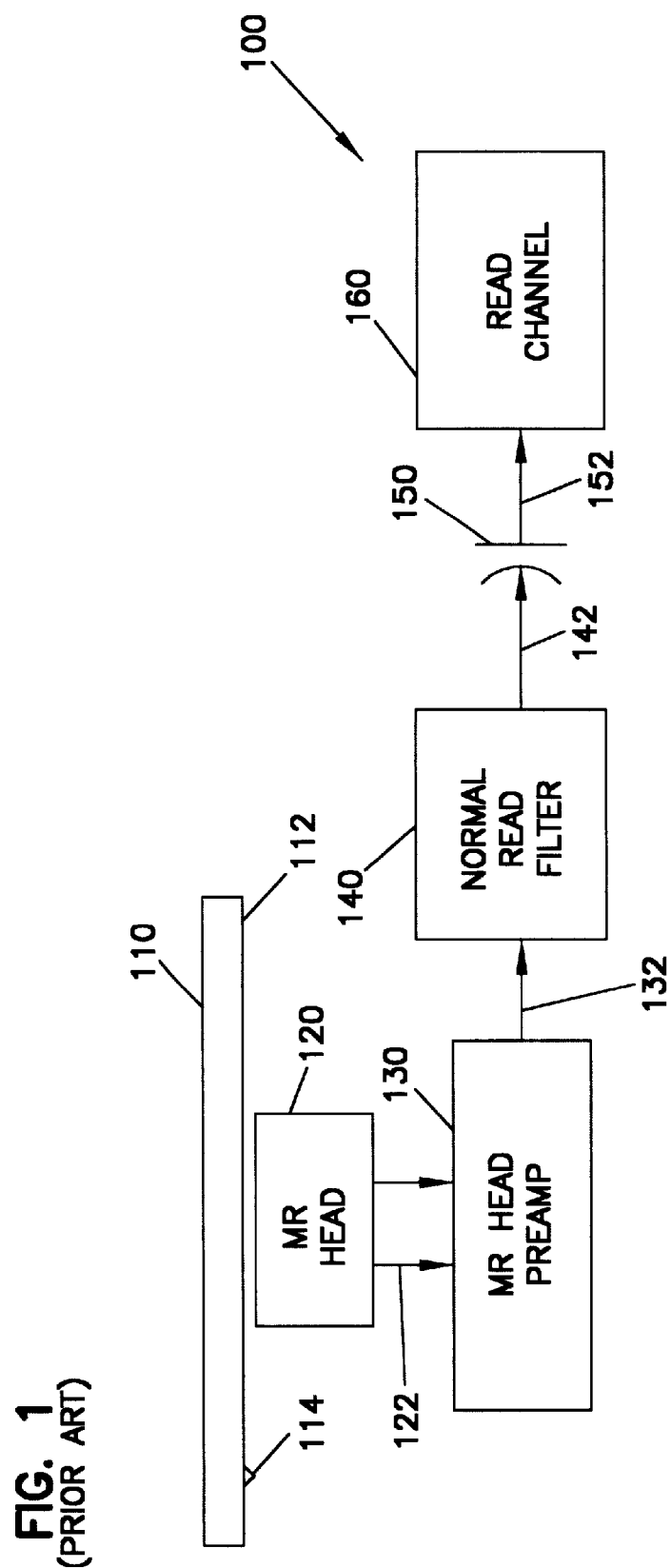
FIG. 1 is a simplified block diagram of a magnetic storage system including a prior art readback channel for reading data from a surface of a magnetic disc.

FIG. 1 is a block diagram of prior art disc drive data recovery system 100 for reading data from surface 112 of magnetic disc 110. Data recovery system 100 typically includes MR head 120, preamplifier circuit 130, read filter 140, coupling capacitor 150 and read channel 160. MR head 120 includes an MR transducer carried on a slider which "flies" over surface 112 of disc 110. Sometimes, the term "MR head" is used to refer to the transducing element only. As used herein, the term can mean the transducing element only, in which case a slider carries the MR head. In the alternative, the term "MR head", as used herein, can mean the transducing element and the slider (i.e., the "head slider").

MR head 120 is typically coupled via electrical connections 122 to preamplifier 130. Preamplifier 130 is typically coupled via electrical connection 132 to read filter 140. Read filter 140 is typically coupled to read channel 160 via electrical connection 142, coupling capacitor 150 and electrical connection 152. The block diagram of FIG. 1 is intended to diagrammatically illustrate the data recovery system of a typical disc drive. However, it must be noted that other circuits and/or components may be included with, or substituted for, those shown in FIG. 1. For example, MR head 120 can be interpreted to include any necessary drive circuitry which may be needed to drive MR head 120 in a manner known in the art. In the alternative, the drive circuitry can be considered to be an integral portion of preamplifier 130. Similarly, other well known disc drive data recovery system circuits or components can be included or substituted for those shown. Further, filter 140 can have a different physical location in system 100 and/or can be combined with other components.

During normal operation of data recovery system 100, MR head 120 flies over surface 112 of disc 110 in order to read magnetically stored data from the disc. In response to the data read from surface 112, MR head 120 provides a read signal at electrical connection 122 which is indicative of the data. Preamplifier 130 amplifies the read signal and provides it to read filter 140 via electrical connection 132. Read filter 140 filters the read signal in accordance with preferred read channel characteristics as is known in the art, and provides a filtered read signal to read channel 160 via electrical connection 142, coupling capacitor 150 and electrical connection 152.

Whenever the magnetoresistive head 120 contacts the disc surface, a significant increase in the temperature of the MR element is observed. This causes an unwanted increase in the output signal which is observed as a rapid change in the base line of the readback signal. Then, the magnetoresistive element begins to cool which results in a decay in the base line of the readback signal until it reaches its normal value. Such a phenomenon is observed when the magnetoresistive element 120 contacts an asperity 114 on the surface 112 of disc 110.

Figure 2:
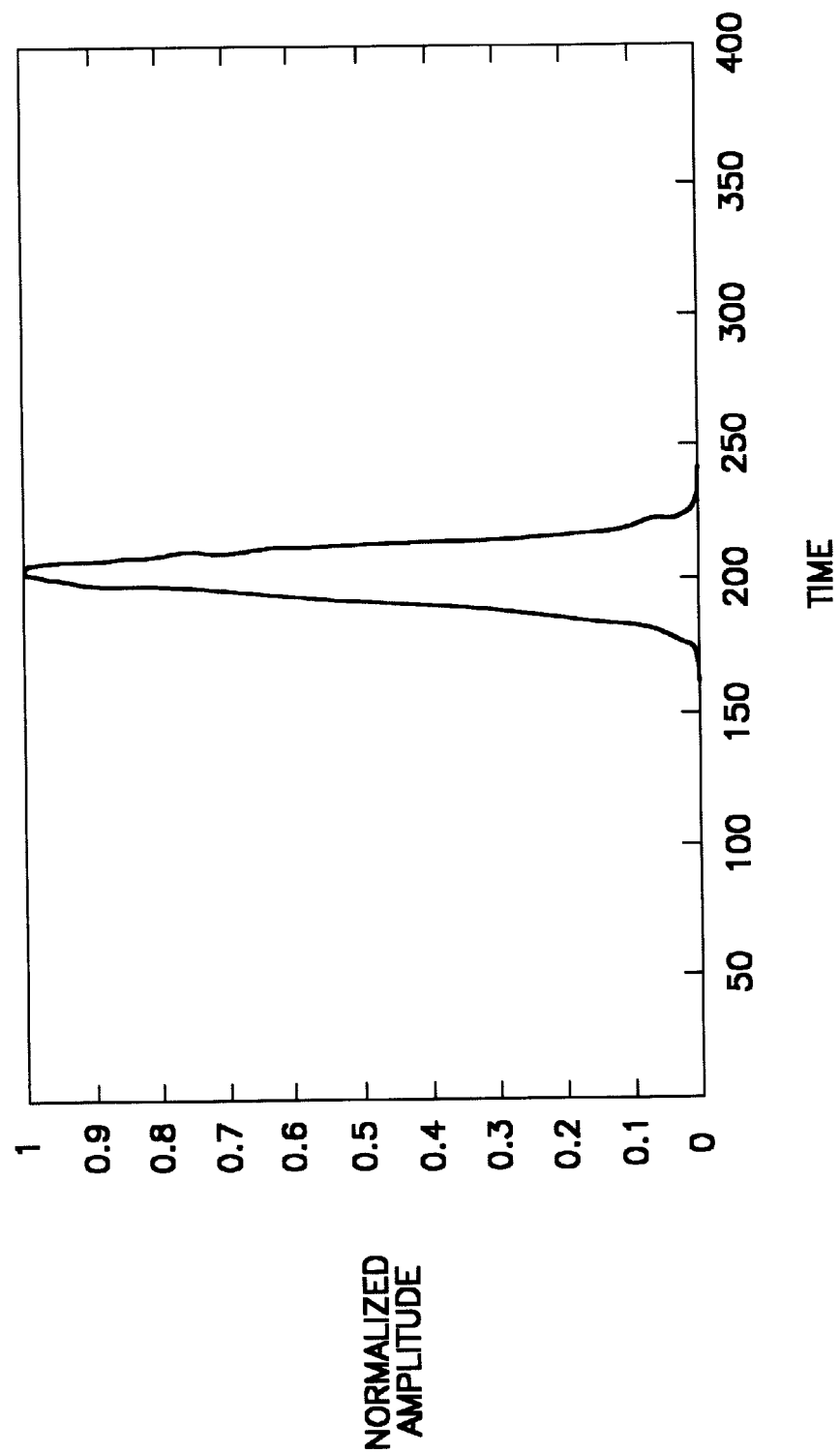
FIG. 2 is a graph of an example of a normalized perpendicular recording system impulse response in the analog domain (over sampling ratio equal to 10).
Figure 3:
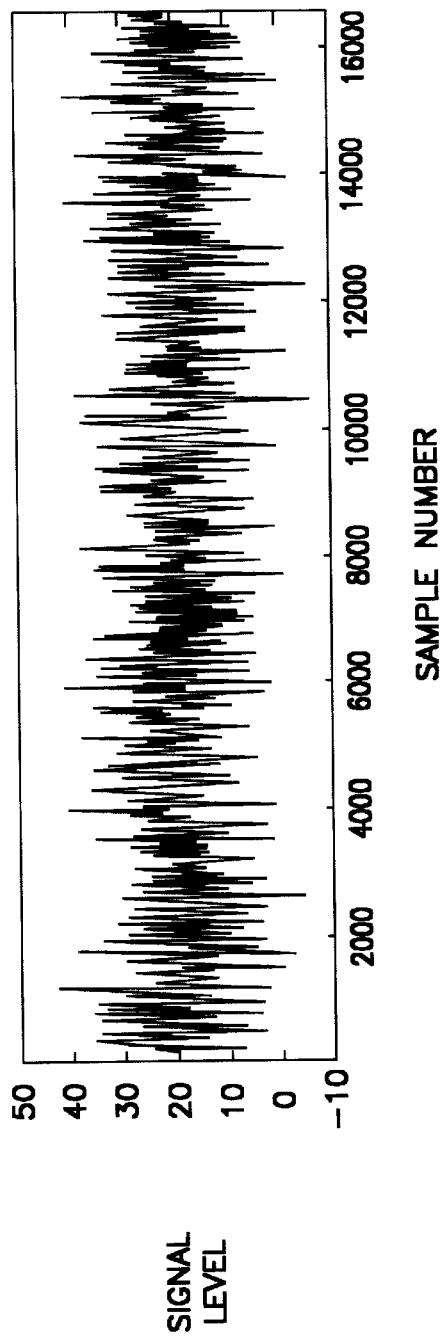
FIG. 3 is a graph of signal level vs. sample number showing a normal readback signal.
Figure 4:
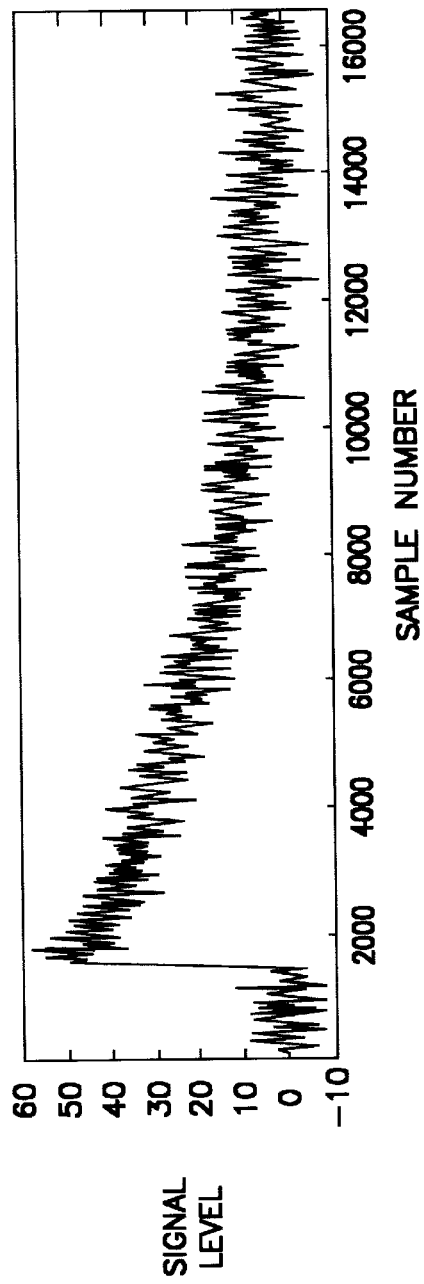
FIG. 4 is a graph of signal level vs. sample number showing a readback signal in the presence of a thermal asperity.

In order to consider the effect of a thermal asperity on a readback signal, a first example using a perpendicular recording system with an impulse response such as shown in FIG. 2 is examined. FIG. 2 is a graph of normalized amplitude vs. time in the analog domain. The impulse response is convolved with an input bit stream (randomly taking values of either 1 or −1) to obtain a readback signal as illustrated in the graph of FIG. 3. FIG. 3 is a graph of a number of samples in the analog domain vs. signal level. However, when an impact between the magnetoresistive head 120 and the asperity 114 occurs, the thermal asperity introduces an offset in the baseline as illustrated in the graph of FIG. 4. The thermal asperity causes a significant and rapid change in the baseline level. As the sensor cools, the baseline offset decays until the original value is reached.

The sudden significant change in the baseline value of the readback signal affects system performance in a number of ways. The magnitude of the readback signal may increase so rapidly that it may cause the magnetic recording medium to reach its saturation limits. When in saturation, any recorded data will be erased. Even if there are no such "erasures," the sudden significant change of the baseline level affects the performance of the entire system. More specifically, the sudden significant change of the baseline caused by the thermal asperity results in a degradation of the signal to noise ratio (SNR) in the system. The present invention addresses this degradation in the signal to noise ratio.

The present invention provides a real time filtering technique which can be easily implemented and is very effective in detecting and canceling thermal asperity effects.

Figure 5:
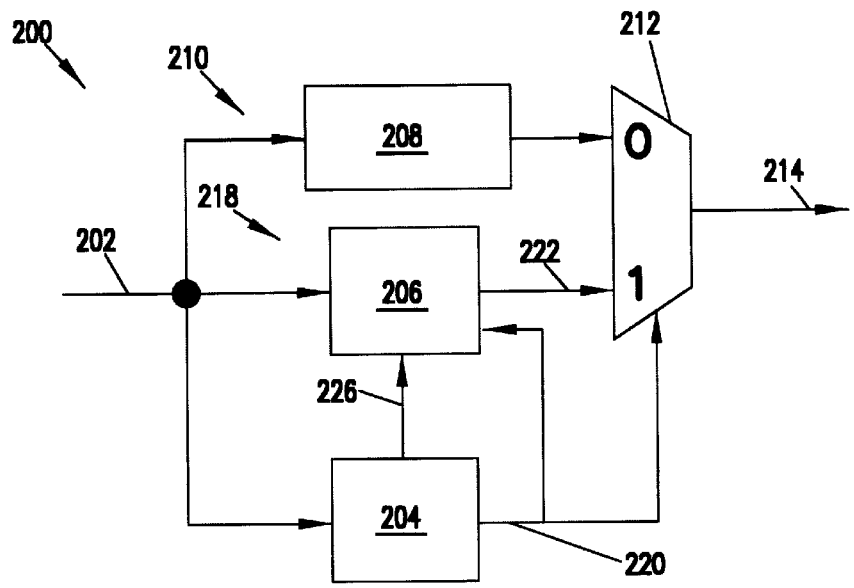
FIG. 5 is a simplified block diagram of a data recovery system in accordance with the present invention.

FIG. 5 is a simplified block diagram of a thermal asperity detection and cancellation circuit 200 in accordance with the present invention. Circuit 200 can be placed, for example, in front of or following, or in place of, normal read filter 140 shown in FIG. 2. Circuit 200 includes a normal readback path 210 and a thermal asperity cancellation readback path 218. Circuit 200 receives readback signal input 202 which is applied to a TA (thermal asperity) detect circuit 204, a TA correct or cancellation circuit 206 and a buffer 208. During normal operation, the readback signal which follows nominal path 210 through buffer 208 is selected by switch 212 and provided to readback output 214. However, if TA detect circuit 204 detects the presence of a thermal asperity, a high output is provided on detect output line 220 to TA correct circuit 206 and to switch 212. When line 220 is high, the readback signal which follows path 218 is selected by switch 212. The TA correct circuit 206 provides a corrected readback signal on line 222 which is then output on line 214. An intermediary signal, representative of the readback signal following low pass filtering, is also applied to TA correct circuit 206 by TA detect circuit 204 on line 226 as discussed below in more detail. TA correct block 206 includes a buffer of length B which is configured to provide the same latency as buffer 208. Thus, the readback signal will have the same latency regardless of the signal following the nominal path 210 or the thermal asperity cancellation readback path 218.

Figure 6:
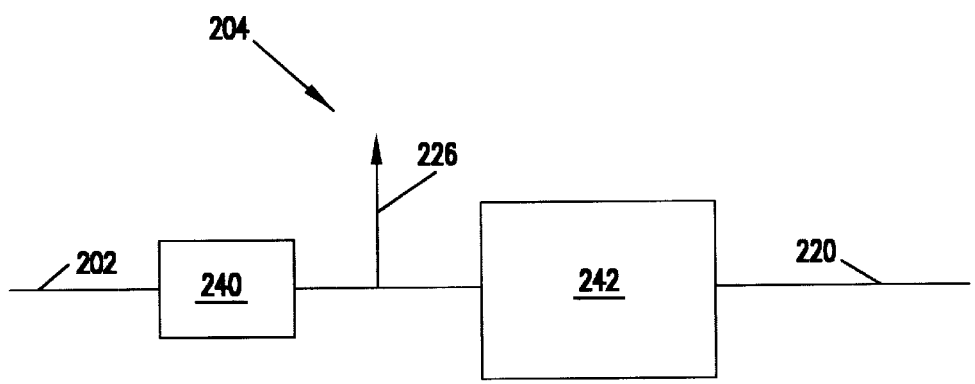
FIG. 6 is a simplified block diagram of a thermal asperity detect circuit of FIG. 5.

FIG. 6 is a more detailed block diagram of TA detect circuitry 204 which includes a low pass filter 240 and a programmable threshold block 242. As discussed above, the baseline of the readback signal changes significantly in the presence of a possible thermal asperity. Thus, by detecting a significant change in the baseline of the readback signal it is possible to detect the occurrence of a thermal asperity.

Filter 240 can comprise any appropriate filter. In one specific embodiment, the z transform representation of the filter 240 is given by:

$$L(z) = \frac{k}{1-(1-k)z^{-1}}, \quad (1)$$

where k is a parameter of the filter. For k=1/16, the corresponding low pass filtered version of the readback signal in the presence of a thermal asperity is shown in the graph of FIG. 7. With k=1/1024, the resulting low pass filtered signal is shown in the graph of FIG. 8. As illustrated in FIGS. 7 and 8, when k is small, the low pass filtered output from filter 240 becomes "cleaner." However, with such a configuration the filter cannot respond to a sudden baseline change as quickly as for larger values of k. It is desirable to use large k values to identify where the TA started and small values to identify where the TA ended.

The output from low pass filter 240 is provided on line 226 to TA correct circuit 206 which uses the filtered output as discussed below in more detail. The output low pass filter block 240 is also provided to threshold block 242 which provides a TA detected output on line 220. Initially, the TA detected signal is set to 0 by threshold block 242. The TA detect algorithm is preferably designed with some hysteresis. For example, if the filtered signal is larger than a first threshold level (threshold-1), the TA detected output on line 220 is set to 1. Further, if the TA detected output is 1 and the output from the filter 240 is less than a lower threshold (threshold-2) then the TA detected output is set to 0. If the filtered output is not less than threshold-2, the TA detected output is left unchanged. The sensitivity and robustness of the thermal asperity detection can be adjusted by adjusting threshold-1 and threshold-2.

Figure 9:
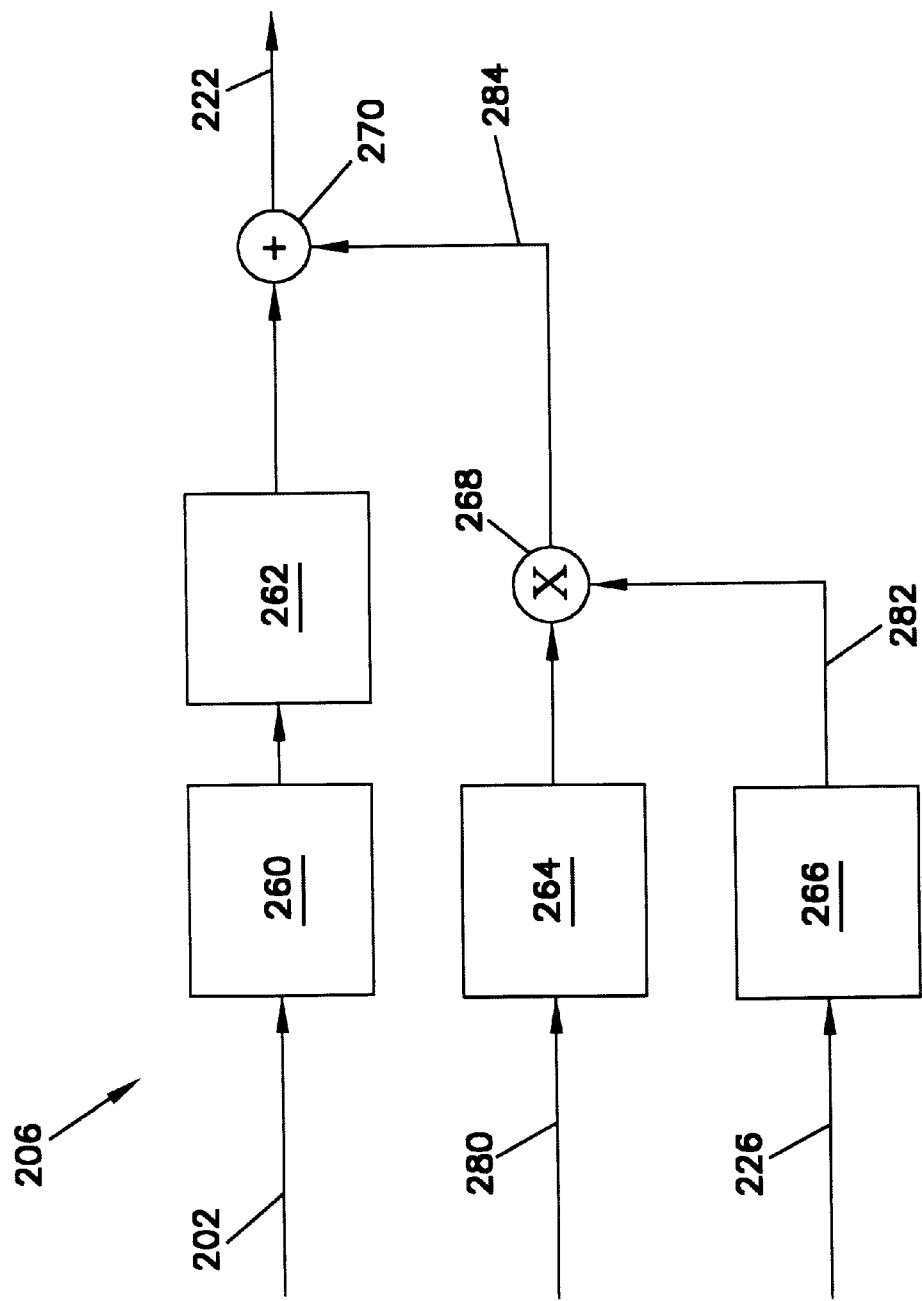
FIG. 9 is a simplified block diagram of a thermal asperity cancellation circuit of FIG. 5.

FIG. 9 is a simplified block diagram showing TA correction circuitry 206 in greater detail. TA correct circuitry 206 includes a buffer 260 of size B coupled to a high pass filter 262. A second low pass filter 264 and a find scale circuit 266 coupled to a multiplication node 268. Output from node 268 couples to summation node 270 which provides a corrected output on line 222 to switch 212 shown in FIG. 2.

Figure 10:
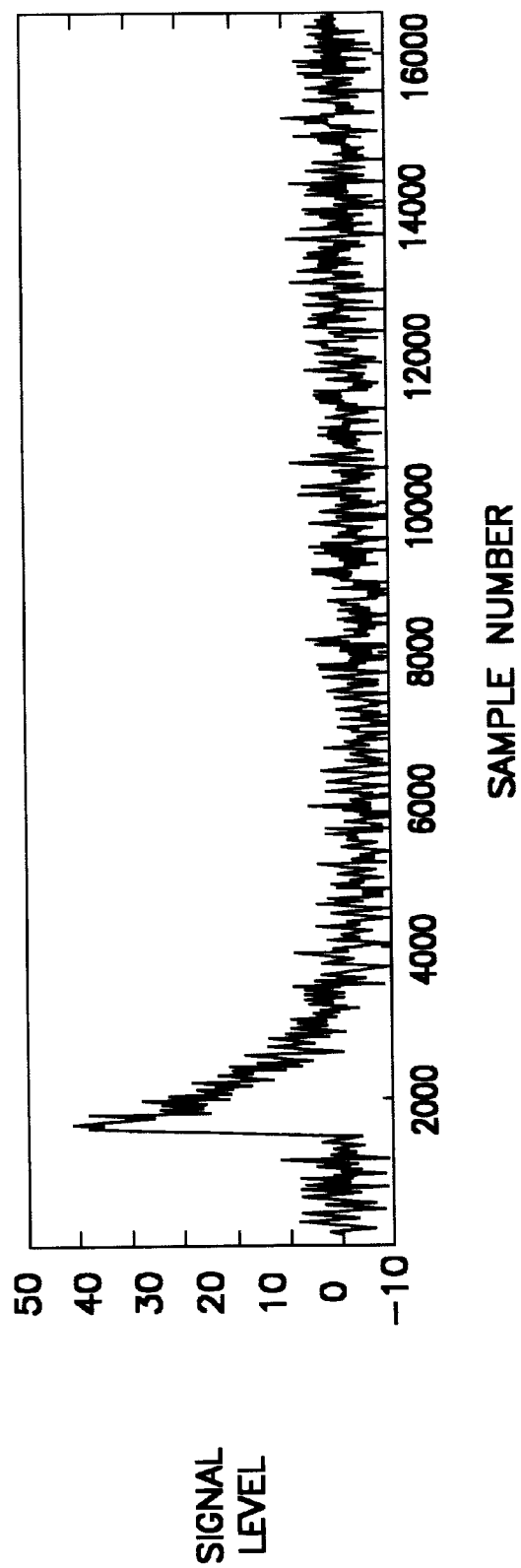
FIG. 10 is a graph of signal level vs. sample number for a readback signal containing a thermal asperity following high pass filtering.

The high pass filter 262 can be of any form or characteristic. In one preferred embodiment, the high pass filter 262 is given as:

$$H(z) = 1 - \frac{m}{1-(1-m)z^{-1}}, \quad (2)$$

where m is a parameter of the filter. For example FIG. 10 is a graph of a signal level vs. sample number showing the output from filter 262 for a readback signal containing a thermal asperity in which m=1/1024. The high pass filter can be selected to reduce the time for the baseline level to decay back to its original level. Further, the filter makes the rate of decay of different size thermal asperities substantially constant.

Although the high pass filter 262 reduces the time for the baseline to decay back to the original level, the thermal asperity still remains in the filtered signal. If the high pass cutoff frequency is increased, the decay time is decreased. However, this will result in the filtering of low frequency contents of the readback signal which will affect system performance. The use of a second low pass filter in block 264 is provided to address this problem. Any appropriate low pass filter can be used, however, in one specific embodiment the filter of the form:

$$L2(z) = \frac{n}{1-(1-n)z^{-1}}, \quad (3)$$

where n is a parameter of the filter.

Low pass filter 264 receives a fixed pattern input on line 280. The fixed pattern input is set to 0 when TA detect from block 204 is 0. However, when block 204 detects a thermal asperity, the fixed pattern on line 280 comprises a series of N consecutive 1's. Following N consecutive 1's, line 280 is again set to 0. The parameters n and N determine the rise time and decay time of the low pass filter output which is output to node 268.

Although the rise time and decay rate of the output from filter 264 can be adjusted, the gain should also be adjusted to match the maximum level of the baseline present in the output from filter 262. This is achieved using the find scale block 266 which receives the low pass filtered signal from detect block 204 on line 226. The find scale block 266 operates by providing an output representative of the maximum value of the low pass filtered readback signal whenever the TA detect signal is high. This is assigned to be the maximum value. For the next M samples of the low pass filtered readback signal, the current sample is compared to the maximum value at that instant. If the value of the current sample is larger than the maximum value, the maximum value is updated to the current sample value. This has the effect of windowing the signal such that the find scale block 266 defines the maximum signal value in the low pass filter readback signal within a window of size M. At the end of the Mth sample, the maximum value is frozen. M can be set to a fixed value or can be adaptive. For example, M can be selected to be the number of samples which occur between the low pass filter readback signal exceeding threshold-1 (discussed above) and following below threshold-1 or threshold-2.

At each instant, the output of the output 282 from find scale block 266 is set to be K times the maximum value at that instant, where K is a fixed number. Because there is a finite number of N consecutive 1's at the input of filter 264, the output of filter 264 cannot rise to 1, but instead becomes at most 1/K. Then, the fixed K value is sets the maximum value to the unity. For example, for N=40 and n=512+256=768, K becomes close to 20.

The correct scale for the output of the low pass filter 264 is selected so that a pulse cancel signal on line 284 is such that it can be subtracted from the output of the high pass filter 262 to cancel the remaining thermal asperity effect in the output on line 222. However, if the subtraction of the pulse cancel signal on line 284 begins just prior to the TA detected signal going high on line 220, the thermal asperity is more effectively cancelled from the output signal on line 222, particularly at the beginning of the thermal asperity. The buffer 260 of size B is used to provide a desired delay. B is preferably programmable, to address this timing issue. Specifically, the TA detect circuitry 204 generates a TA detected signal by monitoring the unbuffered readback signal. Then, in the TA correct circuitry 206, the readback signal is buffered by buffer 260 and the pulse cancel signal is generated on line 284 as discussed above. The pulse cancel signal is subtracted from the buffered and high pass filtered input signal such that the subtraction relative to the output signal actually begins before the TA detected signal goes high. In order for the system to have the same latency in both paths 210 and 218 shown in FIG. 5, the buffer 208 has the same length (duration) as the buffer 260.

Figure 11A:
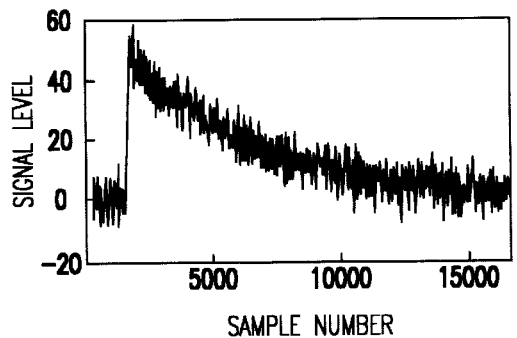
FIGS. 11A, 12A and 13A are graphs of signal level vs. sample number for readback signals containing thermal asperities.
Figure 11B:
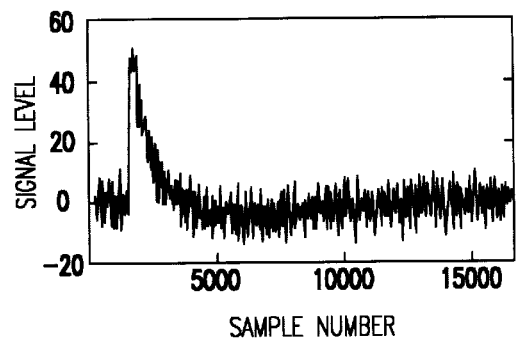
FIGS. 11B, 12B and 13B are graphs of signal level vs. sample number for readback signals following high pass filtering.
Figure 11C:
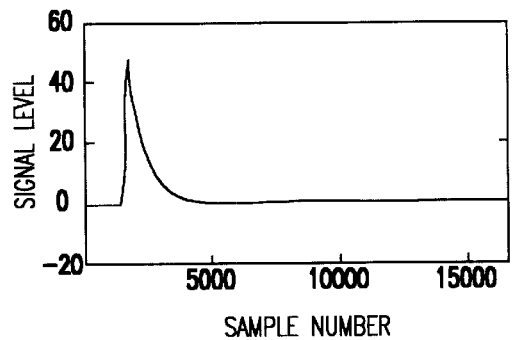
FIGS. 11C, 12C and 13C are graphs of signal level vs. sample number showing pulse cancel signals.
Figure 11D:
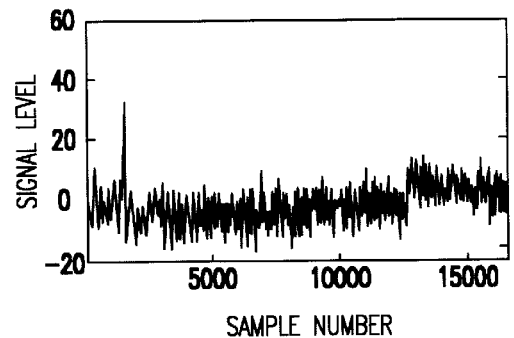
FIGS. 11D, 12D and 13D are graphs of signal level vs. sample number for thermal asperity free readback signals with B=0.
Figure 11E:
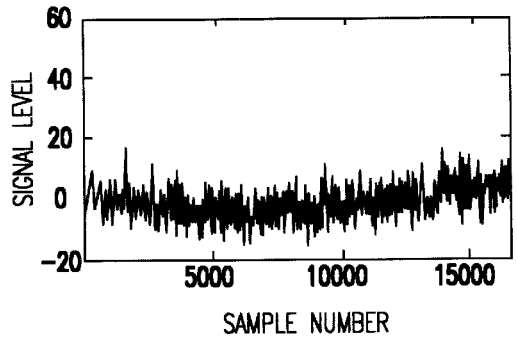
Figure 11F:
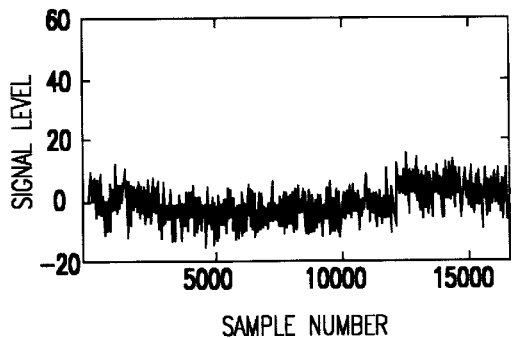
FIGS. 11F, 12F and 13F are graphs of signal level vs. sample number for thermal asperity free readback signals with B=70.
Figure 12A:
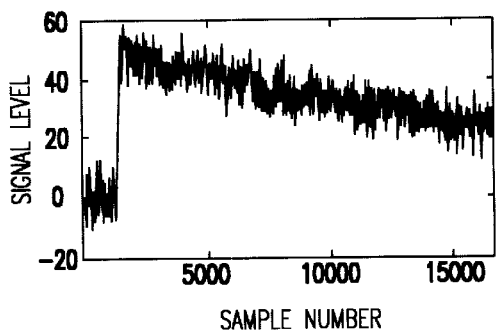
Figure 12B:
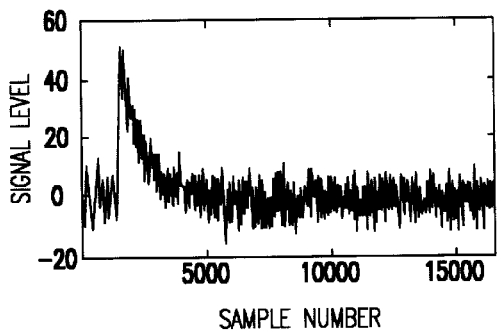
Figure 12C:
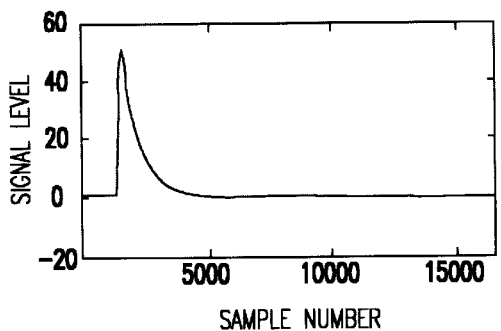
Figure 12D:
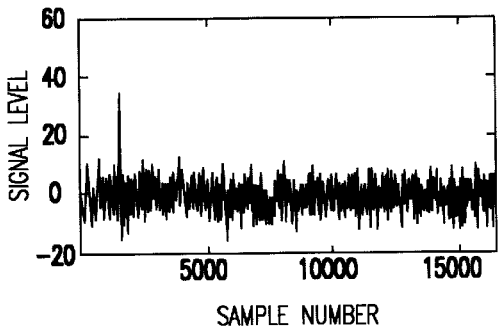
Figure 12D:
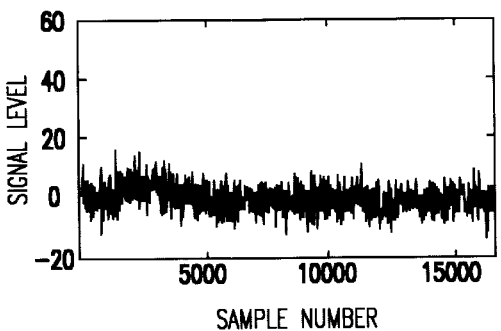
Figure 12F:
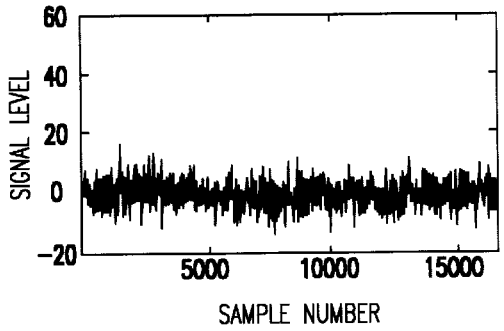
Figure 13A:
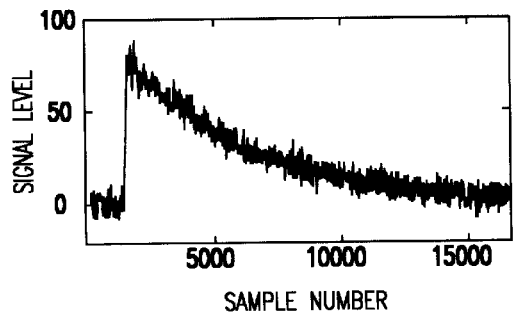
Figure 13B:
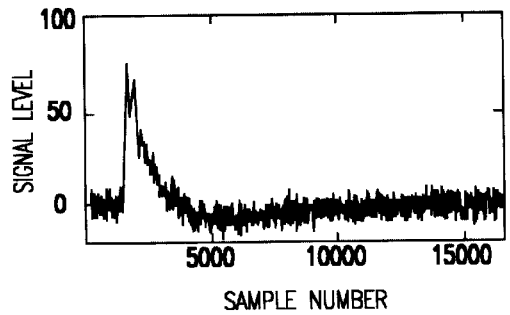
Figure 13C:
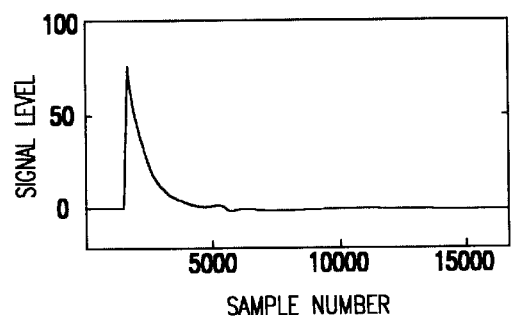
Figure 13D:
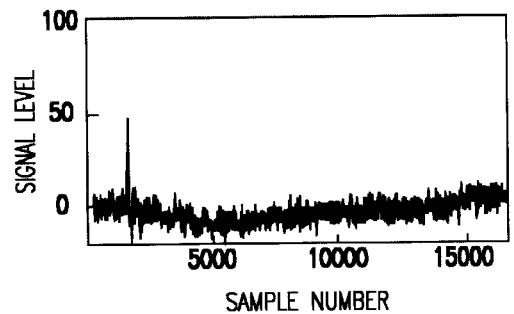
Figure 13E:
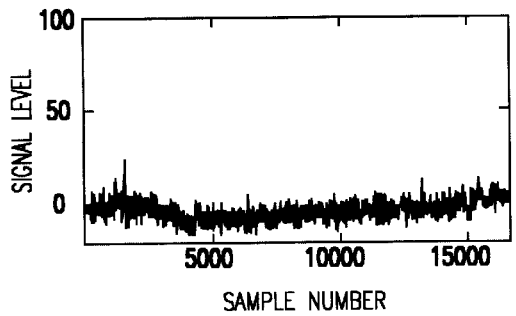
Figure 13F:
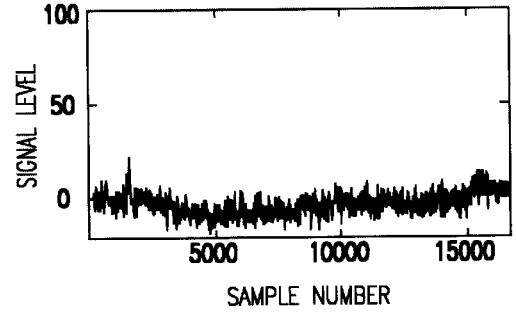

FIGS. 11A–F are graphs of signal level vs. sample number which illustrate operation of the present invention. FIG. 11A is a graph of a readback signal containing a thermal asperity, FIG. 11B is a graph of the resulting output from high pass filter 262, FIG. 11C is a graph of the pulse cancel signal on line 284. FIG. 11B is a graph showing the output on line 222 for B=0, FIG. 11E illustrates B=40 and FIG. 11F is with B=70. As these figures illustrate, the use of the pulse cancel signal effectively removes most of the remaining effects of the thermal asperity and the overall thermal asperity reduction algorithm provides a very clean output signal.

FIGS. 12A–12F are similar to FIGS. 11A–11F but illustrate response of the system to a thermal asperity having a different decay rate. FIGS. 13A-13F are also similar but illustrate operation of the system in response to a thermal asperity having a greater magnitude.

With the various parameters and configurations of the present invention, the invention can be adapted as desired for particular heads or types of thermal asperity signals. The invention is useful with any type of magnetic recording, however, the present invention may be particularly advantageous with perpendicular recording because of the low frequencies present in such systems.

In various aspects, a disc drive data recovery system (100) is provided for recovering data from a magnetic disc (110) using a magnetoresistive head (120) as provided. A thermal asperity cancellation readback path (218) is provided and configured to filter a thermal asperity from a readback signal. The path (218) includes a filter (260) which introduces a delay (262) in the readback signal. A nominal readback path (210) is provided which includes a buffer (208) which delays the readback signal. A thermal asperity detector (204) is configured to detect a disturbance in the readback signal due to a thermal asperity and responsively select the readback signal to the thermal asperity cancellation readback path (218). The nominal path buffer (208) is configured to synchronize data through the nominal path (210) with data through the thermal asperity cancellation readback path (218). The thermal asperity detector (204) can comprise a low pass filter (240) and a threshold detector (242). The threshold detector can provide an output which is a function of a first threshold level and a second threshold level. The thermal asperity filter (206) can include a high pass filter (260) and a pulse cancel signal (284) configured to cancel a pulse due to the thermal asperity. The pulse cancel signal (284) can be a function of a low pass filter (264) configured to receive a fixed pattern input (280). A method to adjust the scale accordingly via 266 is also provided.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the thermal asperity reduction system while maintaining substantially the same functionality without departing from the scope and spirit of the present invention. In addition, although the preferred embodiment described herein is directed to a disc storage system for storing data, it will be appreciated by those skilled in the art that the teachings of the present invention are applicable to other types of storage systems.

What is claimed is:

1. A disc drive data recovery system for recovering data from a magnetic disc using a magnetoresistive head, comprising:

a thermal asperity cancellation readback path configured to cancel a thermal asperity from a readback signal, including a filter which introduces an asperity filter delay in the readback signal;

a nominal readback path including a buffer to delay the readback signal; and a thermal asperity detector configured to detect a disturbance in the readback signal due to a thermal asperity and responsively select the thermal asperity cancellation readback path;

wherein, the nominal path buffer is configured to synchronize data through the nominal path with data through the thermal asperity filter readback path.

2. The apparatus of claim 1, 1 wherein the thermal asperity detector comprises a low pass filter and a threshold detector.

3. The apparatus of claim 2, wherein the threshold detector provides an output as a function of a first threshold level and a second threshold level.

4. The apparatus of claim 1, wherein the thermal asperity cancellation path includes a high pass filter.

5. The apparatus of claim 4, wherein the thermal asperity cancellation path further includes a pulse cancel signal configured to cancel the thermal asperity from a signal from the high pass filter.

6. The apparatus of claim 5, wherein the pulse cancel signal is a function of an output from a low pass filter configured to receive a fixed pattern input.

7. The apparatus of claim 5, wherein the pulse cancel signal is a function of a scale adjustment.

8. The apparatus of claim 1, wherein the buffer in the nominal readback path provides a delay.

9. A method of recovering data from a magnetic disc in a disc storage system using a magnetoresistive head, comprising:

providing a thermal asperity cancellation readback path which cancels a thermal asperity from a readback signal, and introducing an asperity filter delay in the readback signal;

providing a nominal readback path including a buffer to delay readback data;

detecting a disturbance in a readback signal due to a thermal asperity and responsively selecting a readback signal through the thermal asperity cancellation readback path; and synchronizing data through the nominal path with data through the thermal asperity cancellation readback path with the buffer in the nominal readback path.

10. The method of claim 9, wherein detecting includes a low pass filtering the readback signal and detecting a threshold.

11. The method of claim 9, wherein detecting includes comparing the filtered readback signal to a first threshold level and a second threshold level.

12. The method of claim 9, wherein the thermal asperity cancellation path includes a high pass filter.

13. The method of claim 12, wherein the thermal asperity cancellation path further includes a pulse cancel signal configured to cancel the thermal asperity from a signal from the high pass filter.

14. The method of claim 13, wherein the pulse cancel signal is the function of an output from a low pass filter configured to receive a fixed pattern input.

15. The method of claim 14, wherein the pulse cancel signal is further a function of a scale adjustment to the output of the low pass filter.

16. A disc drive data recovery system for recovering data from a magnetic disc using a magnetoresistive head, comprising:

thermal asperity cancellation means for canceling a thermal asperity from a readback signal and having a thermal asperity cancellation path;

thermal asperity detect means for detecting a thermal asperity in the readback signal and switching the readback signal from a nominal path to the thermal asperity cancellation; and nominal path buffer means for synchronizing the readback signal through the nominal path and the thermal asperity cancellation path.

17. The apparatus of claim 16, wherein the thermal asperity cancellation means includes a high pass cancellation means for filtering the readback signal.

18. The apparatus of claim 16, wherein the thermal asperity cancellation means includes means for generating a pulse cancel signal applied to the readback signal.

* * * * *

UNITED STATES PATENT AND TRADEMARK OFFICE
CERTIFICATE OF CORRECTION

PATENT NO. : 6,754,015 B2
DATED : June 22, 2004
INVENTOR(S) : Mehmet F. Erden et al.

It is certified that error appears in the above-identified patent and that said Letters Patent is hereby corrected as shown below:

Title page,
Item [54], Title, change "HEADS" to -- HEAD --.

Column 8,
Line 21, after "claim 1," delete "1".

Signed and Sealed this

Fifteenth Day of March, 2005

JON W. DUDAS
*Director of the United States Patent and Trademark Office*